United States Patent [19]

Lee

[11] Patent Number: 5,094,031
[45] Date of Patent: Mar. 10, 1992

[54] WHEELED PLANT POT

[75] Inventor: Yao-Kung Lee, Kaohsiung, Taiwan

[73] Assignee: Chen Yih Enterprise Co., Ltd., Kaohsiung, Taiwan

[21] Appl. No.: 610,704

[22] Filed: Nov. 8, 1990

[51] Int. Cl.5 .............................................. A01G 9/02
[52] U.S. Cl. ...................................................... 47/66
[58] Field of Search ...................... 47/66, 83; 188/1.12, 188/19

[56] References Cited

U.S. PATENT DOCUMENTS

| | | | |
|---|---|---|---|
| 3,238,558 | 3/1966 | Greene | 188/1.12 |
| 4,559,668 | 12/1985 | Black | 188/1.12 |
| 4,664,231 | 5/1987 | James | 188/1.12 |
| 4,681,192 | 7/1987 | James | 188/1.12 |
| 4,685,246 | 8/1987 | Fennell | 47/66 |
| 4,794,727 | 1/1989 | Smith | 47/66 |
| 4,985,960 | 1/1991 | Zun | 188/1.12 |

FOREIGN PATENT DOCUMENTS 3204487 8/1983 Fed. Rep. of Germany .......... 47/66

Primary Examiner—Richard E. Chilcot, Jr.
Assistant Examiner—Joanne C. Downs
Attorney, Agent, or Firm—Ladas & Parry

[57] ABSTRACT

The wheeled plant pot includes a pot with a closed bottom end. The closed bottom end of the pot has a plurality of support members on the underside thereof. A plurality of wheels are detachably and rotatably mounted to the support members so that the pot can be moved about on those wheels. Each of the wheels also has a brake for stopping the same.

4 Claims, 6 Drawing Sheets

WHEELED PLANT POT

BACKGROUND OF THE INVENTION

The invention relates to a plant pot, more particularly, to a plant pot having a plurality of wheels on the bottom of the same so that the plant pot can be conveniently moved about.

Plants, especially flower plants, are grown in houses or offices to create more pleasant surroundings. FIG. 1 shows a conventional plant pot. When the plant pot is large and heavy, it is not easily moved.

SUMMARY OF THE INVENTION

Therefore, it is the main object of the present invention to provide a plant pot which has a wheeled base so that it is easy to move if circumstance requires.

According to the present invention, a wheeled plant pot includes a plate member with a top side and a bottom side, and a plant pot integrally formed with the plate member. A plurality of support members are attached to the bottom side of the plate member. A plurality of wheels are respectively, detachably and rotatably mounted to the plurality of support members, so that the pot can be moved about on said wheels. Each of the wheels has a brake member which is disposed therein to prevent unintentional rolling.

BRIEF DESCRIPTION OF THE DRAWING

Other features and advantages of the present invention will become apparent in the following detailed description, including drawings, all of which show a non-limiting form of the invention, and of which.

DETAILED DESCRIPTION OF THE PREFERRED EMBODIMENT

Figure 1:
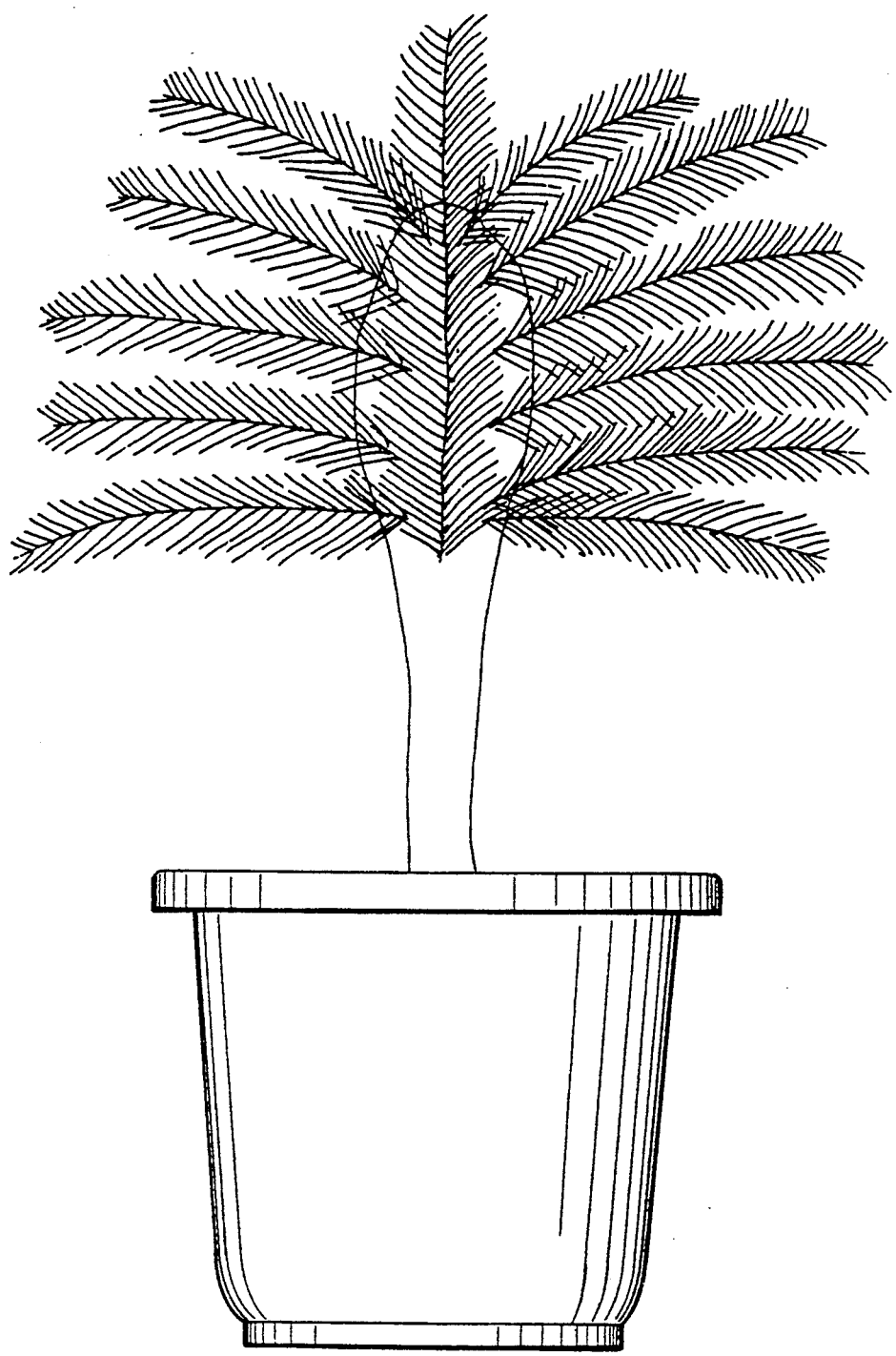
FIG. 1 shows a conventional plant pot of the prior art.
Figure 2:
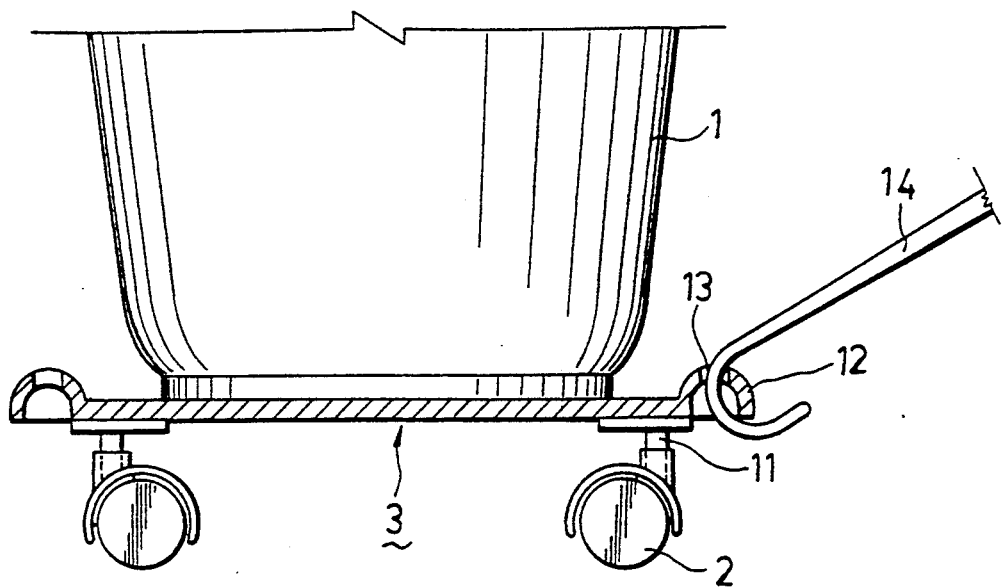
FIG. 2 shows a perspective view of a wheeled plant pot according to the present invention.
Figure 3:
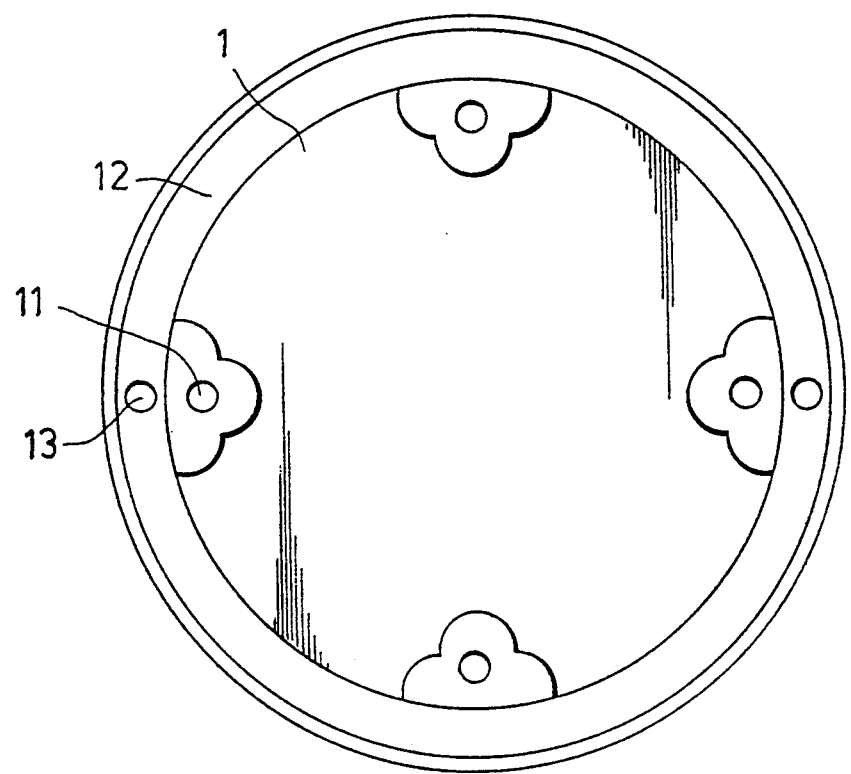
FIG. 3 shows a bottom view of a wheeled plant pot of FIG. 2.
Figure 4:
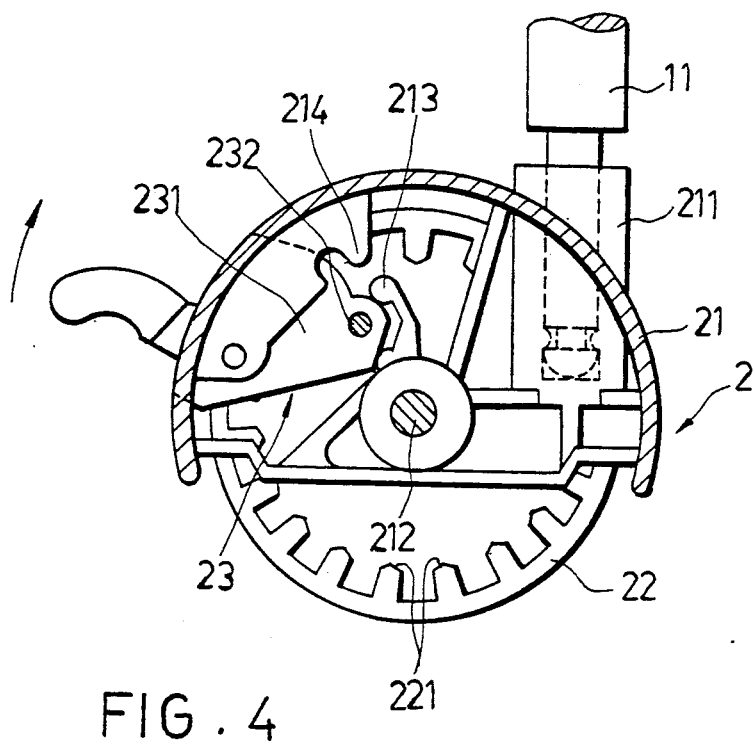
FIGS. 4 and 5 show schematic cross sectional views of a first preferred embodiment of a wheel for the plant pot of this invention showing operation of the brake.

Referring to FIGS. 2, 3 and 4, a wheeled plant pot of the present invention includes a pot (1) having a closed bottom end (3) with an annular flange (12) extending outward from the same.

Said closed bottom end has a plurality of support members (11) on the underside thereof. A plurality of wheels (2) are rotatably and detachably mounted on those support members so that the pot (1), no matter how heavy it may be, can be rolled about on the wheels. For convenience's sake, the annular flange (12) of the bottom closed end (3) may be constructed to have a plurality of holes (13) around the edge, so that the pot can be moved about with a hook (14) hooked to said holes (13), as shown in FIG. 2.

To prevent unintentional movement of the plant pot, each of the wheels (2) has a brake member (23). Each of the wheels (2) has a cover (21) to shield the wheel (2), and an axle on which the wheel rotates. The wheel has a closed side and open side, regularly spaced teeth (221) project inwardly from the periphery (22) of the wheel on the closed side. The brake member includes an engaging member (214) provided on the inner surface of the cover in such a manner that when the wheel is rotated, it passes between the engaging member, and a lever (231) with a protrusion portion (232) which lever is pivotally connected to the engaging member. When the wheel rotates, the protrusion of the lever (231) rests in the recess (213), which is mounted above the axle (212), as shown in FIG. 4.

Figure 5:
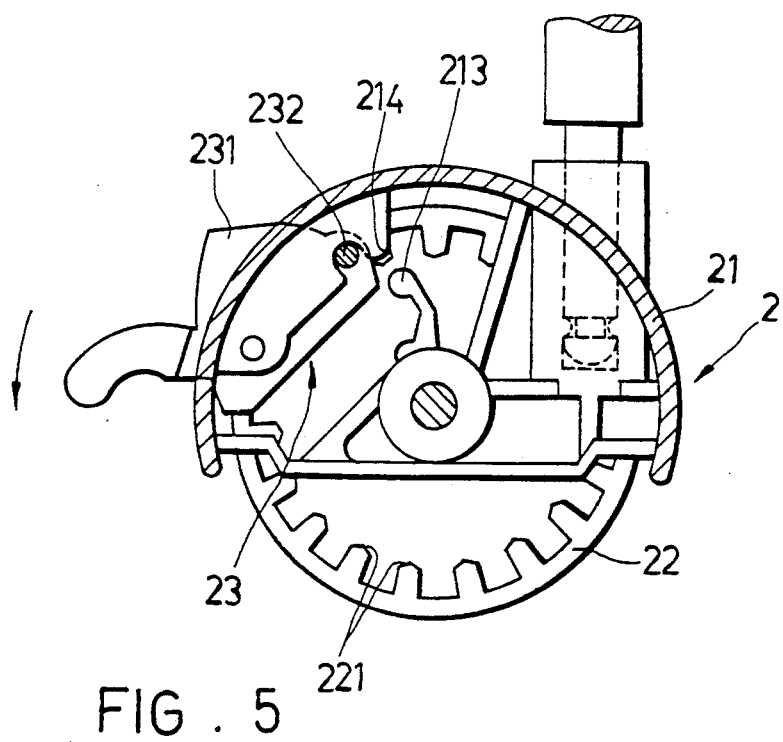

To fix the wheel after moving the plant pot to a suitable place, the extending portion of the lever (231) is pushed downward as shown by the arrow in FIG. 5, raising the protrusion (232) upward out of the recess (213), to engage itself between two adjacent teeth (221) of the wheel (2) in the engaging member (214).

Figure 6:
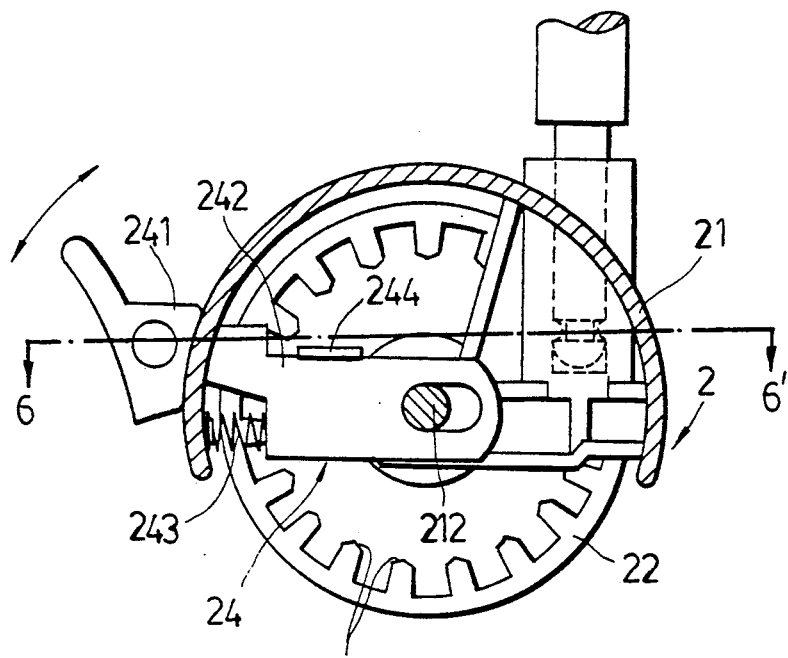
FIGS. 6 and 7 show schematic cross sectional views of a second preferred embodiment of a wheel for a plant pot of this invention showing the operation of that brake.

In another embodiment, the brake member includes a lever (24), the interior portion (242) of which is connected to the axle (212) of the wheel (2). The hole in the interior portion (242) of the lever (24) through which the axle (212) runs is elongated, to allow the lever to move in the plane perpendicular to the axis of the axle (212). A torsion spring (243) provided on the inner surface of the cover (21) abuts said interior portion (242), urging it to move toward the axle (212) away from the cover (21). The outer end of the interior portion (242) of the lever extends through the cover (21), and is pivotally attached to a rocker switch (241), which when pushed downward, counter the force of the torsion spring (243) and draws the interior portion (242) of the lever away from the axle (21) toward the cover (21), as shown in FIG. 6.

Figure 8:
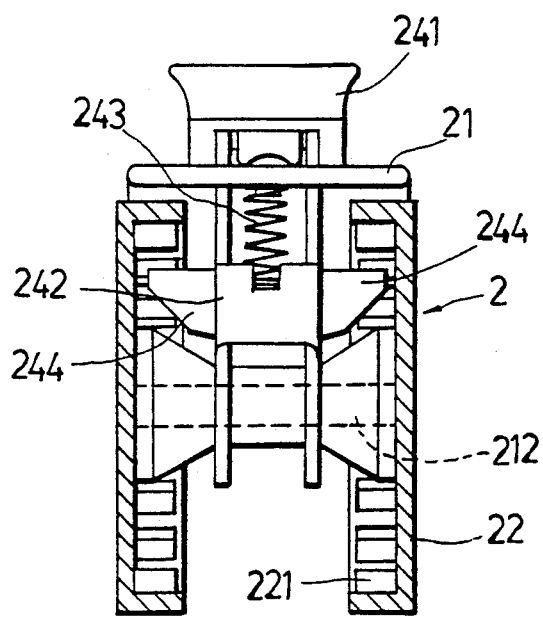
FIG. 8 shows a schematic cross sectional view of a second preferred embodiment of the wheel of FIG. 6, the cross section is taken along the line 6—6'.

One of two engaging members (244) is mounted on each side of the interior portion (242) of the lever between the periphery (22) of the wheel and the axle (212). FIG. 8 shows a top cross sectional view of such a wheel taken along the line 6—6' of FIG. 6.

Figure 7:
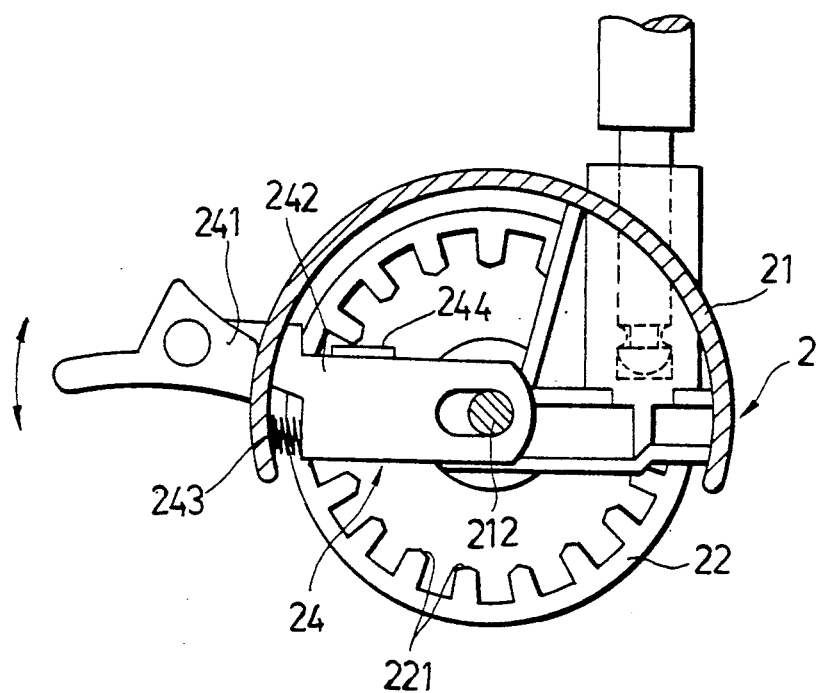

To fix the wheel, one only has to press the rocker switch portion (241) downward as shown in FIG. 7. The engaging members (244) which are attached to the lever will move away from the axle and slip between the inwardly spaced teeth (221) thereby preventing movement of the wheel. The reverse action will allow the torsion spring to disengage from the engaging members (244) of the brake member (24), allowing the wheel to rotate freely.

Figure 9:
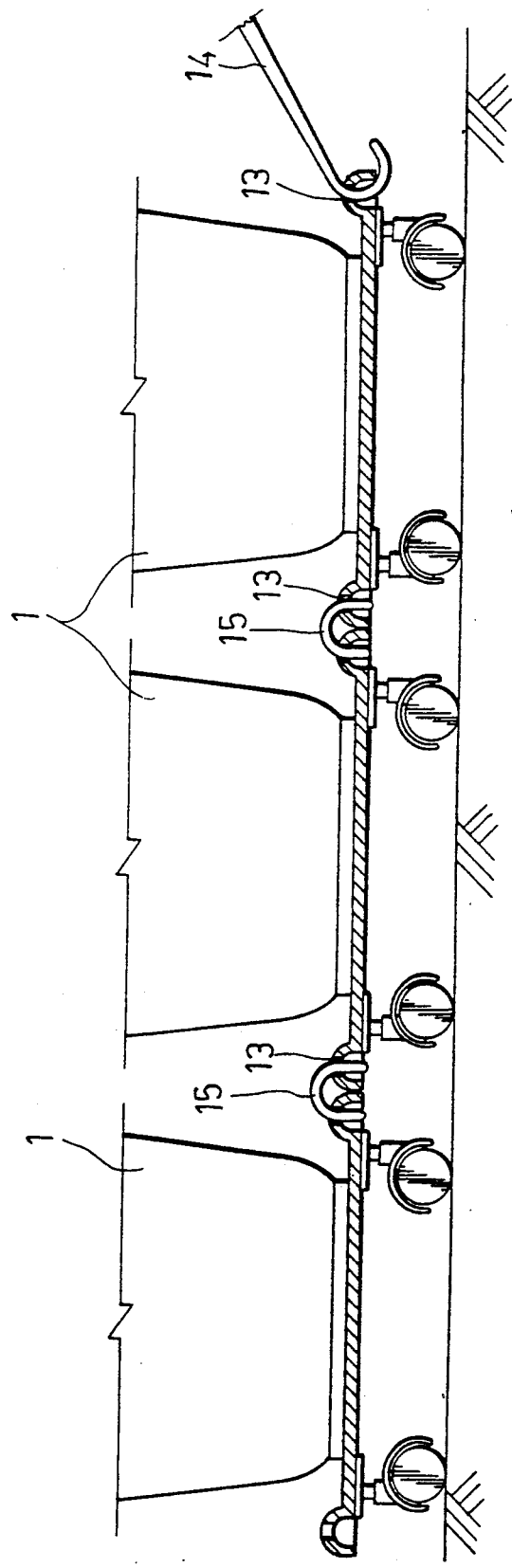
FIG. 9 shows a plurality of plant pots arranged in a row and connected together to form a train.

As illustrated in FIG. 9, a plurality of plant pots (1) can be arranged in a row and connected by curved hooks (15), when it is desired to move all the plant pots at once just by pulling the train. From the illustration, it is clearly understandable that wheeled plant pots are far more conveniently moved than the prior ones.

With the invention thus explained, it is obvious to those skilled in the art that various modifications and variations can be made without departing from the scope and spirit of the present invention, it is therefore intended that the invention be limited as indicated in the appended claims.

I claim:

1. A rolling plant pot comprising:

a pot including an open top and a closed bottom with an annular flange extending outwardly from the periphery of said closed bottom, said annular flange having a plurality of holes formed therealong;

a plurality of support members attached to the underside of said closed bottom; and a like plurality of wheel having an axle means, each said wheel means including a wheel respectively and rotatably mounted to a corresponding one of said plurality of support members, so that said pot can be rolled about on said plurality of wheels, each of said wheel means including brake means for fixing the respective wheel against rotation.

2. A rolling plant pot as claimed in claim 1, wherein:

each of said wheel means further comprises a cover partially surrounding the periphery of its corresponding wheel and shielding the same;

each said cover has an inner surface and an outer surface; and each said wheel has a closed side, an open side, and regularly spaced teeth extending inwardly from the periphery of said wheel adjacent said closed side.

3. A rolling plant pot as claimed in claim 2, wherein said brake member comprises; an engaging member provided on the inner surface of said cover; a lever having a first end and a second end, said lever being pivotally connected to said engaging member, said first end being disposed within said wheel, and said second end extending outside of said cover, said first end engaging said teeth of said wheel and said engaging member when said second end is pressed downward, raising said first end upward.

4. A rolling plant pot as claimed in claim 3, wherein said brake member includes: a rocker switch provided on said outer surface of said cover; a lever with an interior end and an exterior end, said exterior end of said lever being pivotally connected to said rocker switch outside and adjacent to said cover, said interior end of said lever having an elongated hole, said interior end being movably connected to said axle of said wheel by said elongated hole; a torsion spring mounted on the inner surface of said cover urging said interior end of said lever to move toward said axle, and two engaging members; one mounted on each side of said interior end in such a manner that said engaging members engage said teeth of said wheel when said rocker switch is pressed downward, drawing said interior end away from said axle.

* * * * *